Oct. 30, 1934.  C. M. HESSON  1,978,630
SEALING OR WRAPPING MACHINE
Filed Aug. 20, 1931   11 Sheets-Sheet 2

Oct. 30, 1934.  C. M. HESSON  1,978,630
SEALING OR WRAPPING MACHINE
Filed Aug. 20, 1931  11 Sheets-Sheet 3

Inventor
Charles M. Hesson
By Milano & Milano
Attorneys

Oct. 30, 1934.  C. M. HESSON  1,978,630
SEALING OR WRAPPING MACHINE
Filed Aug. 20, 1931   11 Sheets-Sheet 5

Inventor
Charles M. Hesson
By Milans & Milans
Attorneys

Oct. 30, 1934.  C. M. HESSON  1,978,630
SEALING OR WRAPPING MACHINE
Filed Aug. 20, 1931    11 Sheets-Sheet 6
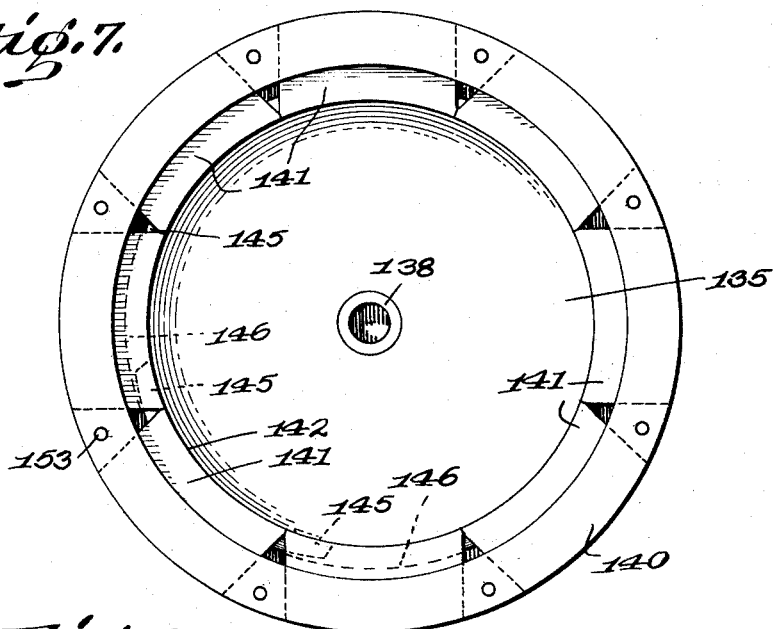
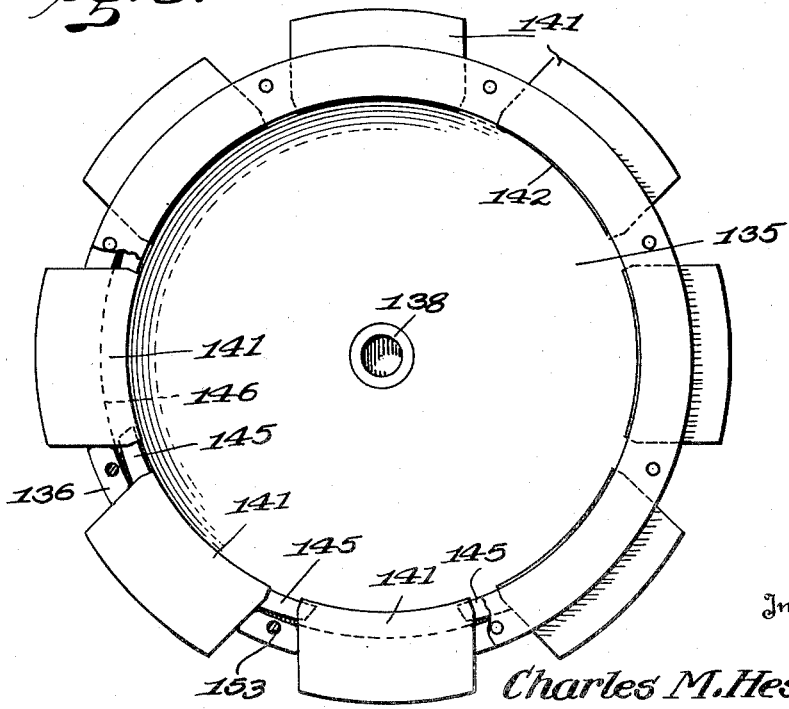
Inventor
Charles M. Hesson
By Milans & Milans
Attorneys

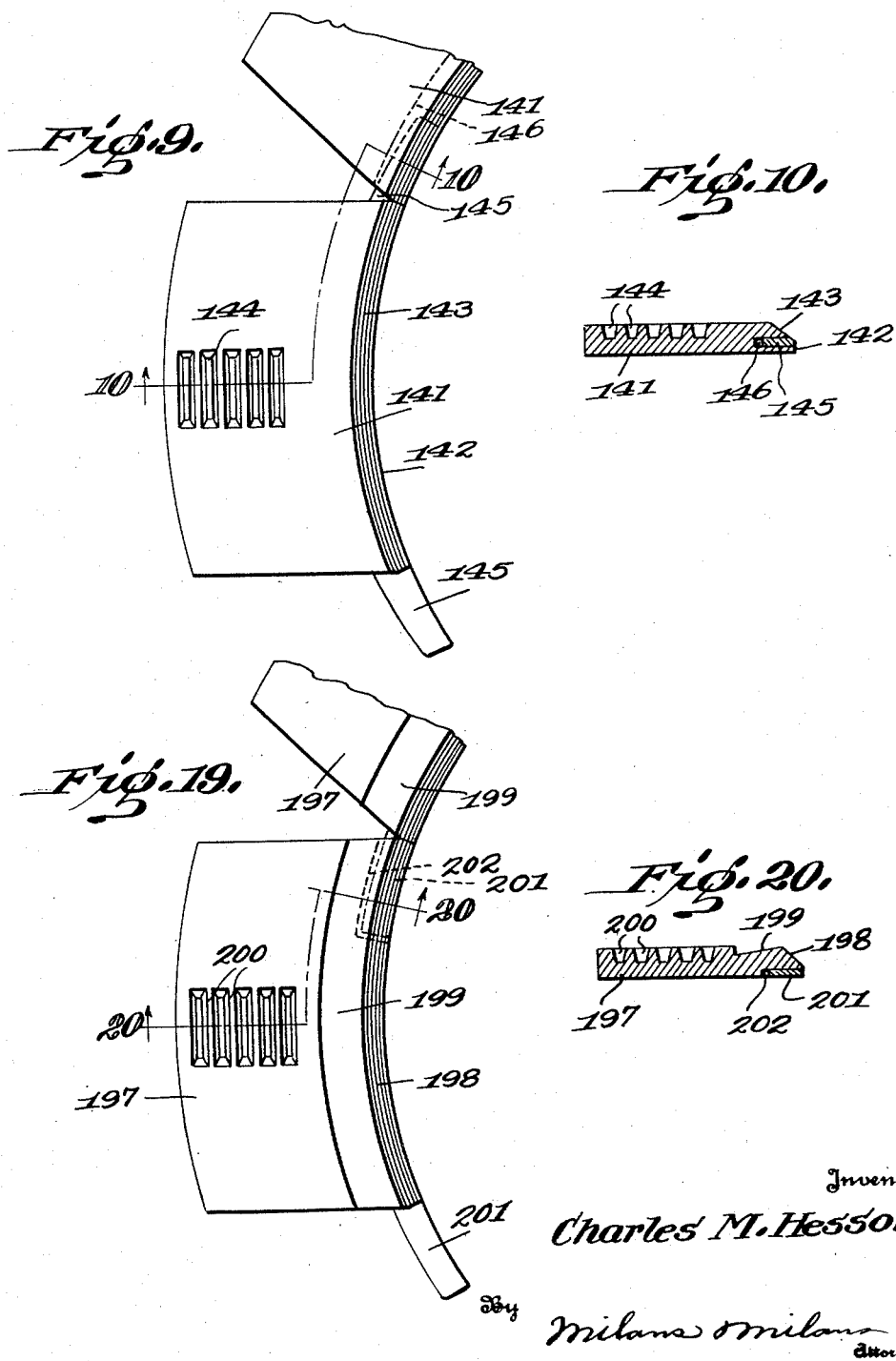

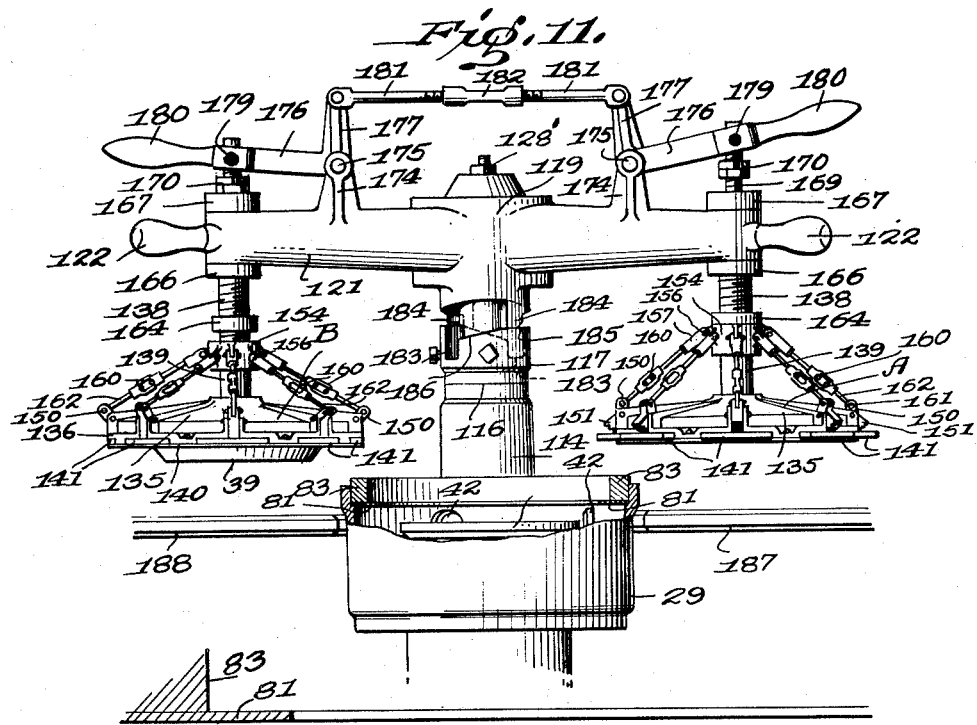
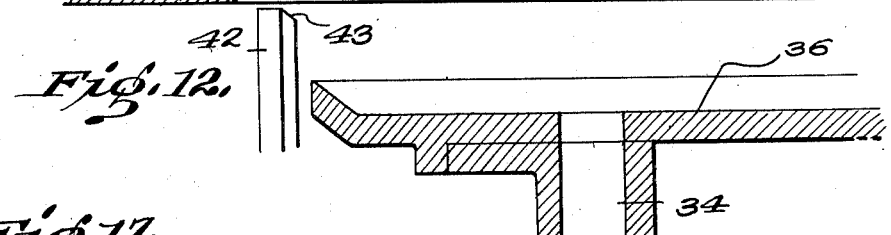
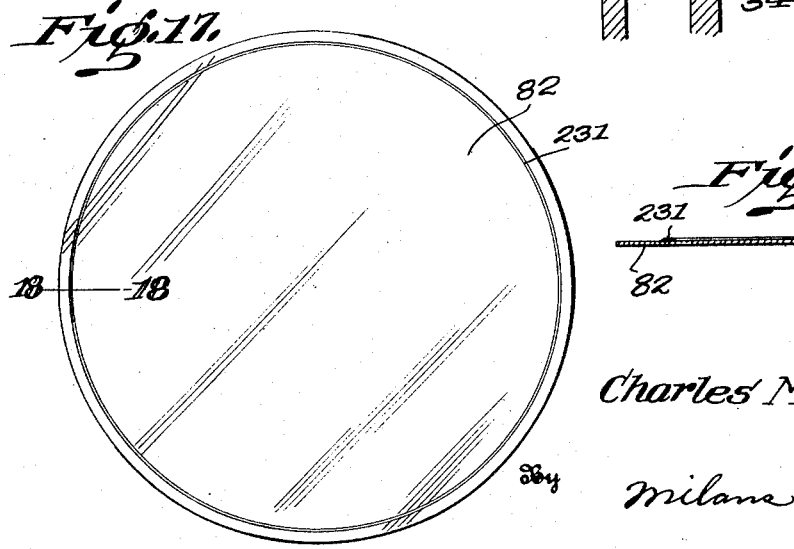

Oct. 30, 1934.  C. M. HESSON  1,978,630
SEALING OR WRAPPING MACHINE
Filed Aug. 20, 1931  11 Sheets-Sheet 9
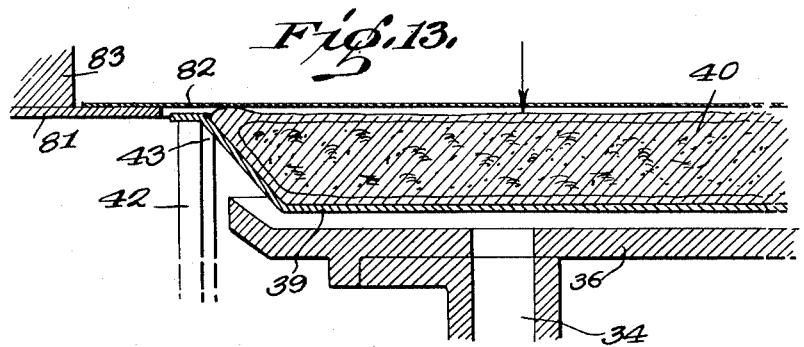
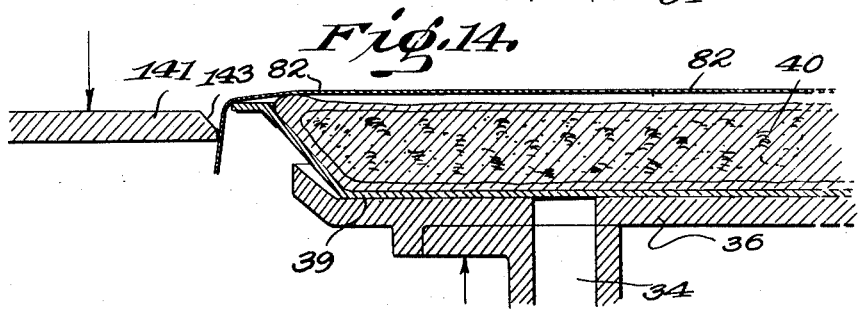
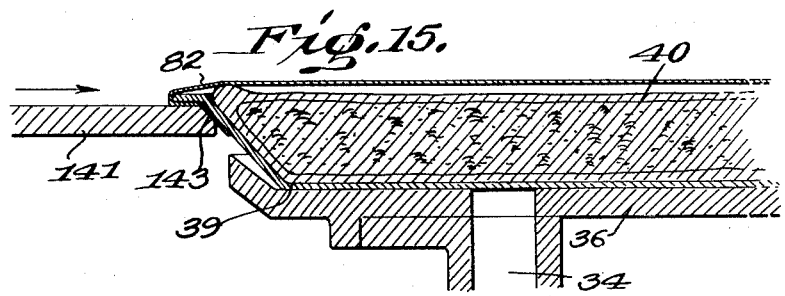
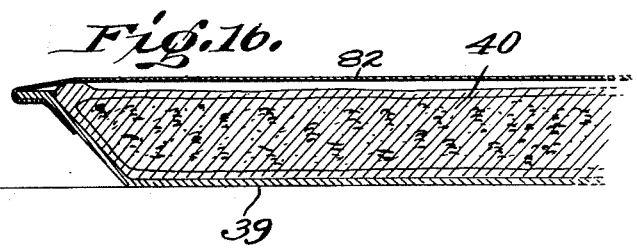
Inventor
Charles M. Hesson
By Milans & Milans
Attorneys

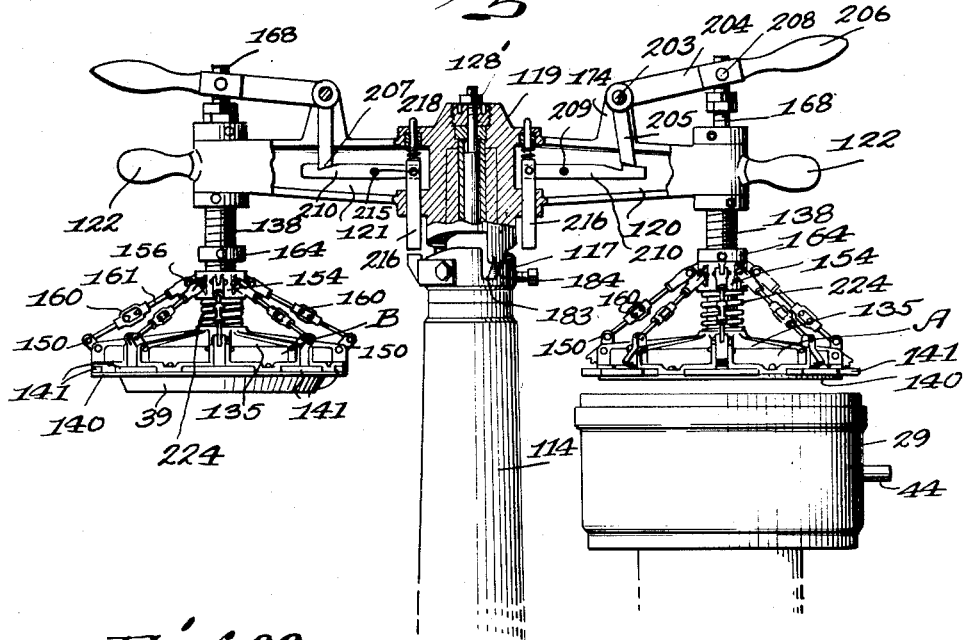
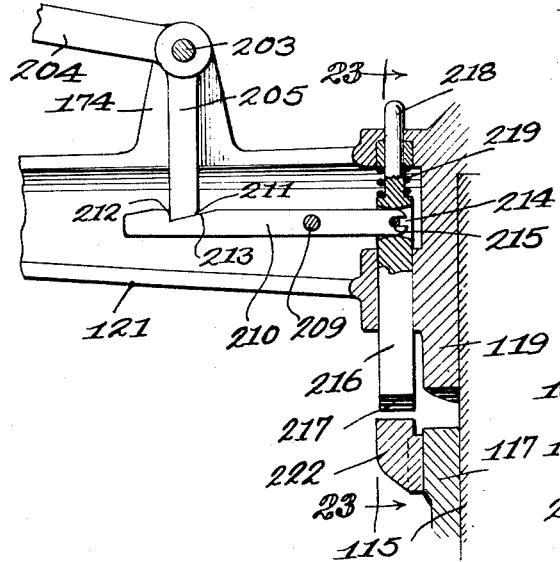
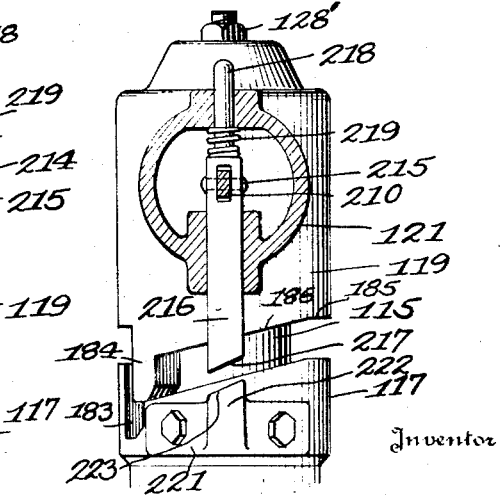

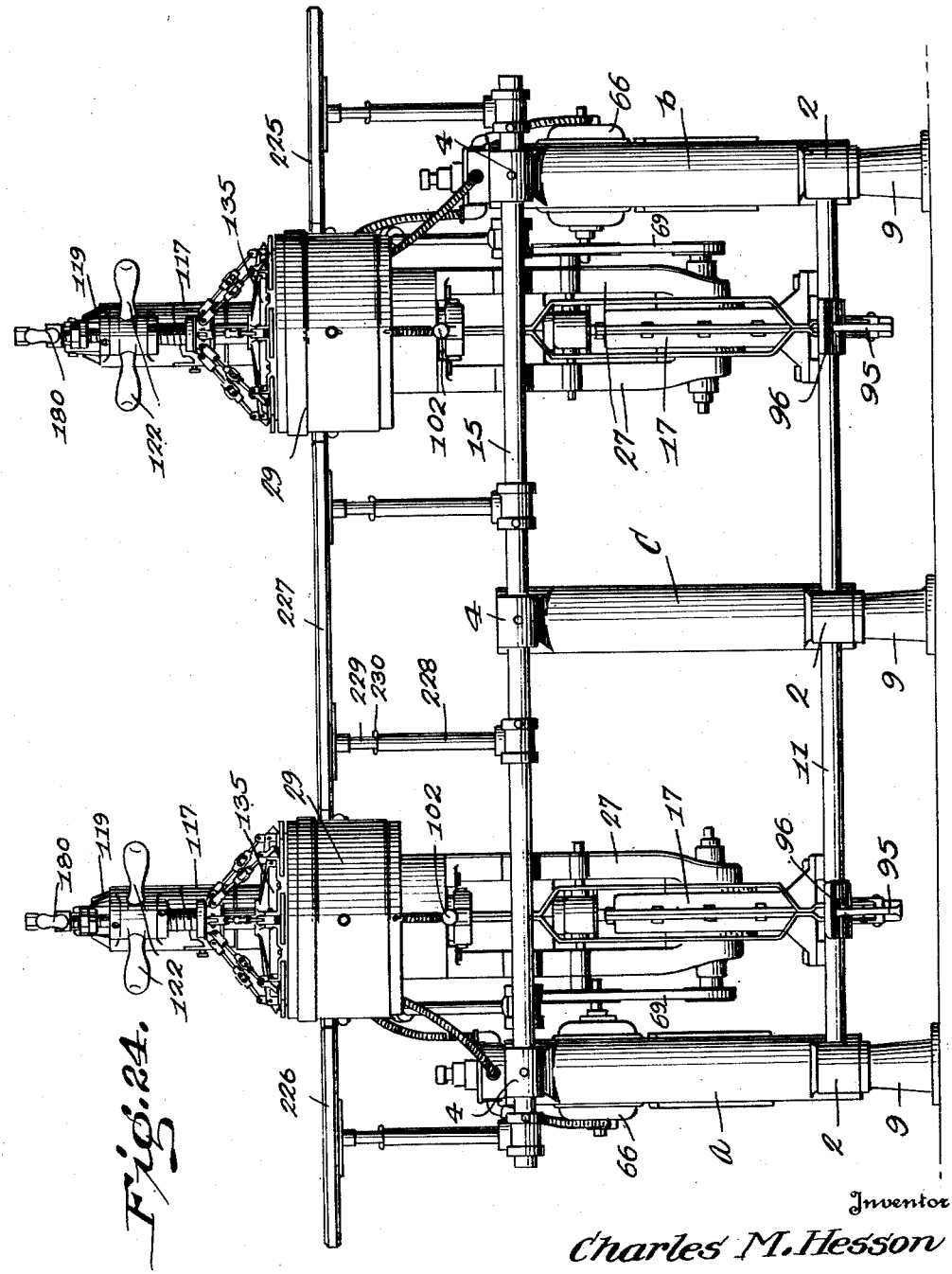

Patented Oct. 30, 1934

1,978,630

UNITED STATES PATENT OFFICE 1,978,630

SEALING OR WRAPPING MACHINE

Charles M. Hesson, Hanover, Pa., assignor to Moul-Hesson Corporation, Hanover, Pa., a corporation of Pennsylvania Application August 20, 1931, Serial No. 558,395

32 Claims. (Cl. 93—2)

My invention relates to new and useful improvements in a sealing or wrapping machine and while I have illustrated, and will describe, the machine as primarily intended for wrapping or sealing pies or the like it will be understood that the machine might equally as well be used for wrapping or sealing other articles which are normally placed upon plates or similar supports.

The principal object of the invention resides in the provision of a machine of the character described which is intended for placing a piece of transparent material over the top of a pie or other article and securing the same to the edge or flange of a plate or similar support and while any desired transparent material, found adapted for the purpose, may be used I have illustrated and will describe such material as being in the form of paper of that character at present upon the market and known as "cellophane".

Another object of the invention consists in the provision of a machine of the character described wherein the pie or similar article carried by a plate, preferably of a molded paper or cardboard composition as now commonly used, is positioned to apply an adhesive under the edge of the plate and when so positioned a strip of paper, such as "cellophane" or the like, is placed in position over the pie and adapted to be engaged and raised thereby as the plate is moved from the adhesive applying mechanism, by a supporting member, members being provided to engage and fold the edges of the covering strip of "cellophane" to fold the same under the edge of the plate containing the pie, while the plate or pie is held upon the support by suction, and pressing the same into tight engagement with the adhesive previously applied.

A further object consists in the provision of means whereby the sealed pie is carried into position to be removed by an operator or to be deposited upon a support, said sealed pie being released as the mechanism is operated for folding the edge of the protecting strip or covering for engagement with the adhesive, two similar members being provided so that as one is in position for securing the strip of material to the plate the other will have carried the sealed pie to its depositing position.

Still another object of the invention consists in the provision of novel means for releasing the sealed pie automatically at the time that the mechanism for folding the edge of the protecting covering and securing the same by the adhesive is operated.

As a further object of the invention I provide suction means whereby the plate containing the pie is normally drawn and held into tight engagement with its support, said suction being broken or removed at the time that the adhesive is being applied to the under surface of the edge of the plate for a purpose and for securing an operation to be later described.

Another object of the invention consists in the provision of means for heating the adhesive material and maintaining the same at the desired temperature, means being provided for automatically cutting off the heat when the temperature reaches the desired point.

A further object resides in the provision of novel means for supporting the machine as well as novel means for operating the several parts so as to require the minimum amount of labor.

Another object consists in so treating or marking the strip or disc which forms the cover or seal that its edges will not curl during the time that it is to be applied.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Figs. 7 and 8 are bottom plan views of the member or head for folding the edges of the protecting covering under the plate and for carrying the sealed article to its point of deposit, Fig. 7 showing the folding blades or members in their innermost positions and Fig. 8 showing such blades or members in their outermost position.

Fig. 9 is a fragmental detail showing in plan two of the folding blades or members and more particularly bringing out the manner in which they are associated one relative to the other.

Fig. 10 is a section on the line 10—10 of Fig. 9.

Fig. 11 is a fragmental front elevation, with parts broken away, showing the sealing and carrying members swung to right angles to their normal positions when a protecting covering is being applied and the pie support shown in its lowermost position.

Fig. 12 is a fragmental detail showing a transverse section through the pie support in its lowermost position.

Figs. 13, 14 and 15 are fragmental details in transverse vertical section showing the successive positions of the plate and pie carried thereby during the application of the sealing strip.

Fig. 16 is a fragmental transverse vertical section through a pie and carrying plate showing the sealing cover in position secured to the plate.

Fig. 17 is a plan of a sheet of the material, in the form of a disc, for forming the protecting or sealing cover.

Fig. 18 is a fragmental section, enlarged, on the line 18—18 of Fig. 17.

Fig. 19 is a plan showing a modified form of folding blades or members.

Fig. 20 is a section on the line 20—20 of Fig. 19.

Fig. 21 is a fragmental side elevation, with parts broken away and parts in section showing a modified form of support for the sealing and carrying heads and mechanism for operating the folding blades or members carried by the heads.

Fig. 22 is a fragmental detail, enlarged, partly in elevation and partly in section of the operating mechanism for the folding blades or members shown in Fig. 21.

Fig. 23 is a section on the line 23—23 of Fig. 22 looking in the direction of the arrows; and Fig. 24 is a front elevation showing the manner of supporting and associating a plurality of machines for convenient operation.

Figure 1:
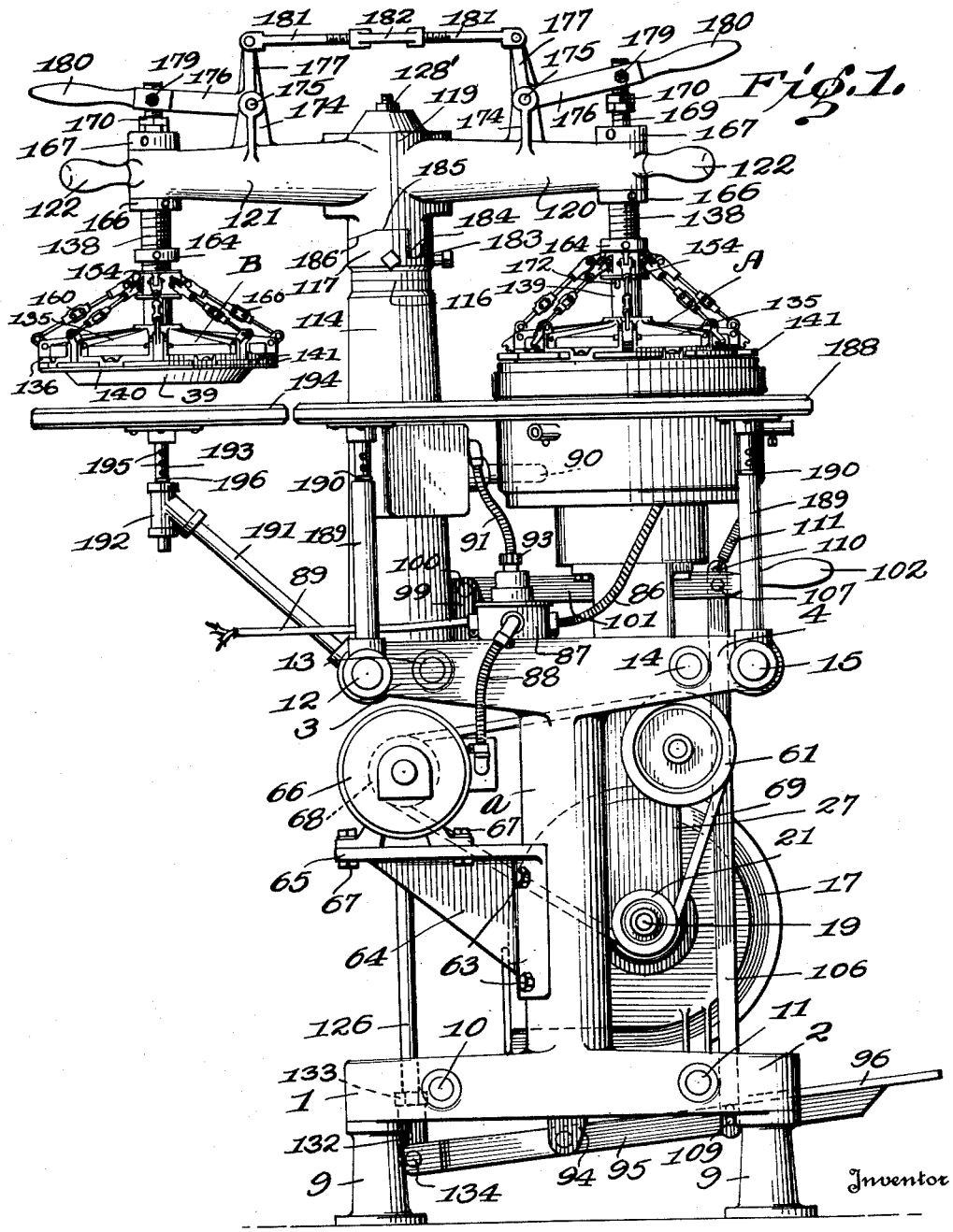
Fig. 1 is a side elevation.

For a great many years pies have been delivered to stores, restaurants or similar places, and sold to the public on plates usually formed of molded paper, paper pulp or similar material and there has been no wrapping or covering for the pie thus exposing them to dirt or other impurities during delivery or at the time on which they are standing on shelves or similar supports or containers and at the same time considerable care is necessary in handling to prevent damage to the pie. In recent years under sanitary rules and regulations the public has been educated to expect, and in fact require, the delivery of commodities in a sanitary condition. It is to provide a sanitary cover or seal for pies or the like that my present machine is intended and the machine which is illustrated may be operated with the minimum amount of labor and at such a speed as to make it commercially practical. In carrying forward my invention the pies are fed to the machine, by hand or, if desired, by automatic means, and a strip or disc of transparent material such as "cellophane" or the like, is placed over the pie and its edges folded inwardly beneath the flange or edge of the plate and secured thereto by means of an adhesive or the like. When thus covered or sealed the pie is delivered and maintained in a strictly sanitary condition and so maintained until it is desired to use. When ready for use the covering strip may be readily removed and the pie either cut into slices while remaining on the original plate or transferred to another plate for service. Not only does my cover or sealing strip maintain the pie in a sanitary condition but holds the pie upon the plate against movement relative to the plate thereby preventing damage thereto. The covering strip being of "cellophane" or similar transparent material adds to the appearance of the pie and when desired may bear any advertising matter such as the name of the baker or the like.

While either the so-called plain or waterproof "cellophane" may be used I have found in practice that it is probably preferable to use the plain "cellophane" or "cellophane" which has not been made waterproof for it is desirable to allow a certain amount of moisture to penetrate to the pie to prevent hardening or cracking of the crust.

In the drawings supporting standards are shown at $a$ and $b$, the standard $a$ having at its lower end the oppositely disposed arms 1 and 2 and at its upper end the oppositely disposed arms 3 and 4. The standard $b$ has at its lower end the oppositely disposed arms 5 and 6 and at its upper end the oppositely disposed arms 7 and 8. The standards are supported from the floor or other support by means of the feet or castings 9, one foot or casting being positioned adjacent the end of each of the arms 1, 2, 5 and 6 as shown quite clearly in the drawings. The standards are connected together by means of the transversely extending connecting rods 10 and 11 which pass through the arms 1 and 5 and 2 and 6 respectively, and the rods 12, 13, 14 and 15, the rods 12 and 13 passing through the arms 3 and 7 while the rods 14 and 15 extend through the arms 4 and 8.

Supported by and spanning the space between the rods 10 and 11 are the plates or strips 16 which in turn support the fan housing indicated generally at 17 and provided with the outlet or discharge opening 18. A shaft 19 extends through the fan housing 17 and is journaled within the bearings 20, this shaft being provided on one end with a pulley 21 for a purpose which will be later apparent. Carried by and rotatable with the shaft 19 is the fan 22, of usual well-known construction, including a central hub 23, through which the shaft extends, outwardly extending spokes 24, an outer rim connected to the spokes 25, and blades 26. Extending upwardly from the sides of the fan housing are the air conduits 27, the lower ends of these conduits communicating with openings formed in opposite sides of the fan housing while the upper ends communicate with the chamber 28 formed as a part of the glue or adhesive pot or container indicated generally at 29. The portion which forms the chamber 28 extends downwardly from the bottom of the pot or container 29 and is secured to the upper ends of the conduits 27 by means of the bolts 30 or other suitable fastenings. The depending portion which forms the chamber 28 also provides the bearing 31 for the depending hollow tube portion 32 of the sleeve 33, the sleeve being adapted for sliding movement within a vertically extending bore formed centrally of the glue pot or container 29. The sleeve 33 is also provided with the vertically extending passages 34 and at its top with the outwardly directed flange 35 to which is secured a dished support 36 having the openings 37 registering with the passages 34. This dished support 36 is secured to the upper end of the sleeve 33 by means of the screws 38 or other suitable fastenings which are received in threaded openings in the flange 35. This dished support 36 is adapted to receive the dish or plate 39, formed of molded paper pulp or similar material which receives the pie 40 as quite clearly shown in the drawings.

Rotatably mounted in the glue or adhesive pot or container 29 are the circumferentially spaced horizontal shafts 41 which carry the adhesive applying discs or rollers 42, the edges of these rollers or discs being beveled as shown at 43 for a purpose which will be later apparent. The discs or rollers will support a dish or plate and apply a line or continuous ribbon of adhesive to the dish or plate in a manner to be later described but, if desired, they may be formed and adapted to apply spots of the adhesive as distinguished from the line or continuous ribbon. The dish or plate being supported by the discs or rollers is rotated as the adhesive is being applied. Formed on or secured to the outer face of each of the discs or rollers 42 is a sleeve 44 through which the shafts 41 extend, these sleeves extending through the vertically extending wall of the pot or container 29, as shown more particularly in Figs. 3, 5 and 6 of the drawings, so that they may be slid upon the shafts to adjust the discs or rollers 42 longitudinally of the shafts. They are held in their adjusted positions by means of the screws 45 or other suitable fastenings, these screws passing through the sleeves and engaging the shafts as shown. By this adjustment the discs may be moved towards or from the vertical center of the pot or container 29 so that they may be used for applying the adhesive indicated at 46 to dishes or plates of varying sizes. The inner ends of the shafts 41 pass through the bearings 47 formed on the bracket member 48 positioned within the sleeve 33 and secured to the vertically extending shaft 49. The bearing portions 47 are received within vertically extending openings 50 formed in the sleeve 33, as shown more particularly in Figs. 5 and 6 of the drawings, so that the sleeve may be slid vertically relative to the bracket and shafts 41. Secured to the inner end of each of the shafts 41 is a beveled gear 51 and these beveled gears mesh with the beveled gear 52 secured to the upper end of the shaft 49. The lower end of the shaft 49 is rotatably supported in the bearing 53 which is formed at its lower end with the housing 54 to receive the gear 55 secured to the lower end of the shaft 49. The bottom of the housing is normally closed by the removable plate 56 secured in position by means of the screws 57 or other suitable fastenings. Meshing with the gear 55 is the worm gear 58 carried by the shaft 59, this shaft being mounted in the bearings 60 formed exterior of the air conduits 27 as shown more particularly in Fig. 2 of the drawings. Secured to one end of the shaft 59 is a pulley 61 positioned relative to the pulley 21, as shown more particularly in Fig. 1 of the drawings. The bearing 53, for the lower end of the shaft 49 is supported by means of the arms 62 extending inwardly from the air conduits 27, as shown more particularly in Fig. 4 of the drawings.

Secured to the standard *a*, by means of the bolts 63 or other suitable fastenings is a bracket 64 having the horizontally extending portion 65 which supports the electric motor 66 secured thereto by means of the nuts and bolts 67 or other suitable fastenings. The motor shaft carries the pulley 68 and a belt 69 is engaged around the pulleys 68, 61 and 21. As the motor is operated it, through means of the belt 69, rotates the shafts 19 and 59 thus driving the fan within the casing or housing 17 and through means of the worm gear 58 and gear 55 rotating the shaft 49 to in turn rotate the horizontal shafts 41 carrying the adhesive applying discs or rollers 42.

Figure 4:
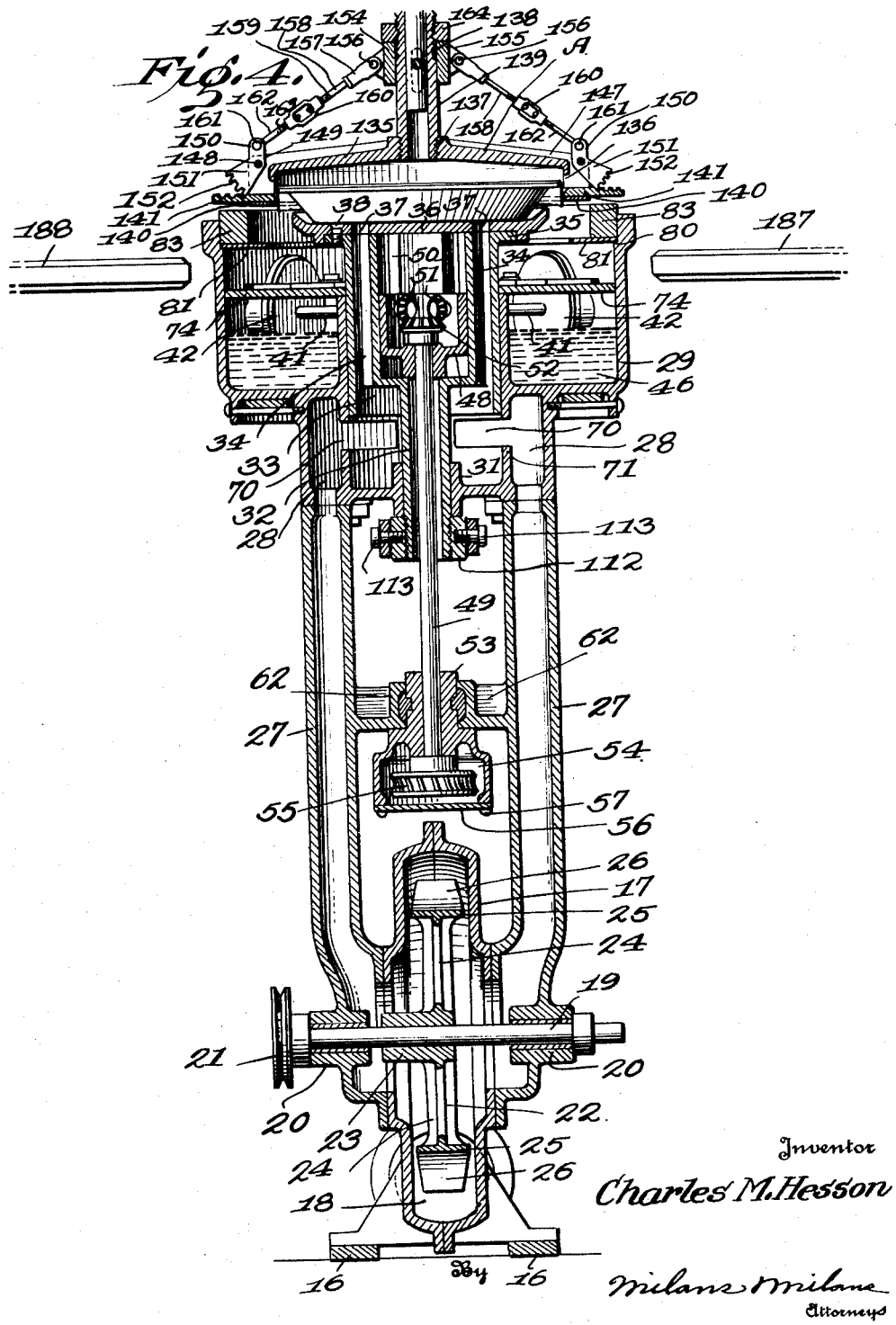
Fig. 4 is a section on the line 4—4 of Fig. 3 looking in the direction of the arrows.
Figure 5:
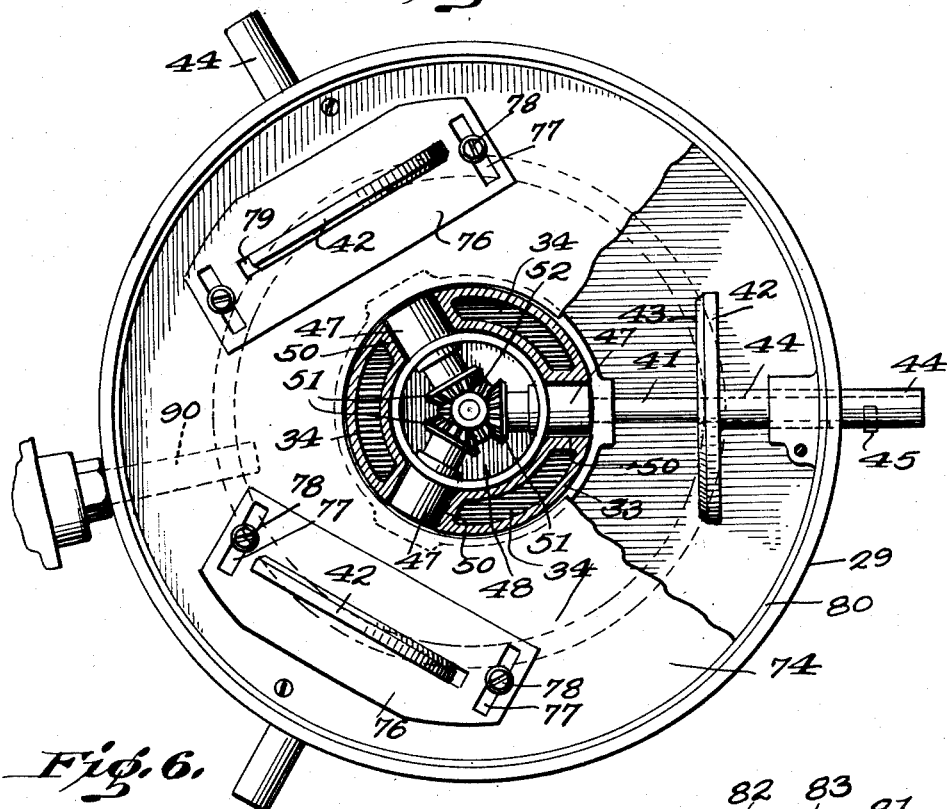
Fig. 5 is a horizontal section on the line 5—5 of Fig. 3 looking in the direction of the arrows.

Communication is afforded between the chamber 28 and the passages 34 in the sleeve 33 through means of the circumferentially extending elongated openings 70 formed in the inner wall 71 of the chamber and as shown, more particularly in Fig. 4 of the drawings, when the sleeve 33 is in its raised position the openings 70 are uncovered and suction is created by the fan 22 thus causing the suction of air through the passages 34, openings 70 and conduits 27 for discharge through the opening 18 of the fan housing, this suction tending to normally hold the dish or plate 39 into tight engagement with its dished support 36. When the sleeve is lowered, in a manner to be later described, the openings 70 will be closed by the lower end of the sleeve and the suction broken to release the engagement of the plate or dish 39 with its support and allow the dish or plate to be supported by the adhesive applying rollers or discs 42, as shown more particularly in Fig. 6 of the drawings, and permit the dish or plate to be rotated so that the adhesive is applied entirely around the under surface of the outwardly directed flange 72 thereof and to a portion, just beneath the flange, of the inclined surface or wall 73. The sleeve 33 is shown in its lowered position, cutting off the openings 70 in Fig. 6.

Figure 6:
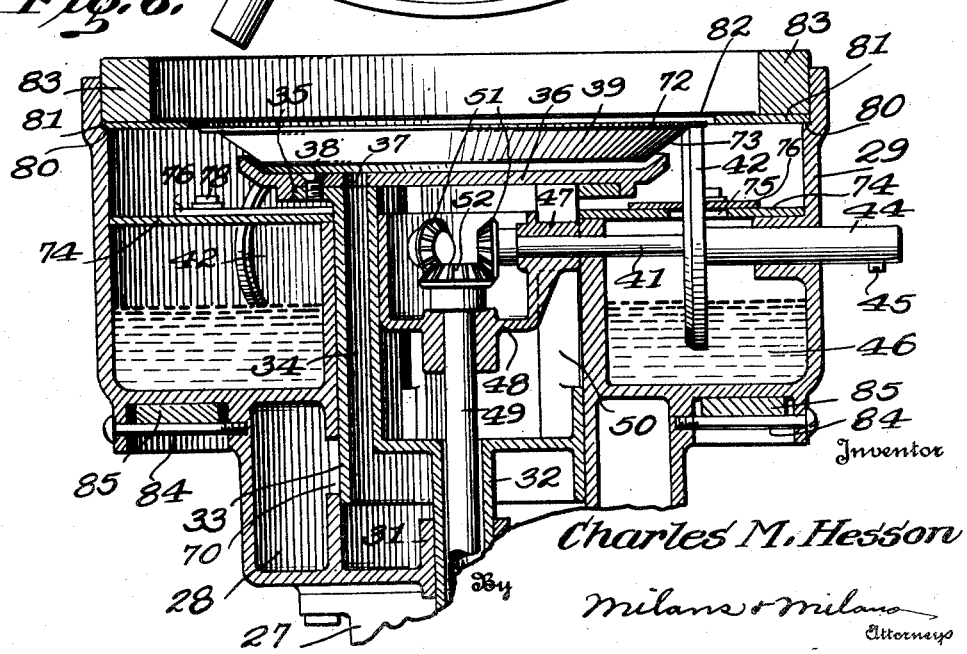
Fig. 6 is an enlarged transverse vertical section, with parts shown in elevation, through the adhesive receptacle and associated parts, showing the manner in which the plate containing the pie will be supported during the application of the adhesive thereto.

Supported within the glue or adhesive pot or container 29 is the plate 74 having the circumferentially spaced openings 75 through which the adhesive applying discs or rollers 42 extend, as shown more particularly in Fig. 6 of the drawings. These openings 75 are of sufficient width, as shown, to permit the adjustment of the discs or rollers 42 on the shafts 41, as previously described. Adjustably connected to the upper surface of the plate 74 are the plates 76 which have, adjacent each end, an elongated opening 77 through which extends a screw 78. These plates are also each provided with an elongated opening 79 of a size to receive the discs or rollers 42, and as shown, these discs or rollers operate in close proximity to one end of the opening 79 to remove excess adhesive therefrom while at the opposite end there is sufficient space, as shown more particularly in Fig. 5 of the drawings, to permit excess adhesive to pass back into the pot or container. As the rollers or discs 42 are adjusted on their shafts 41 the plates 76 may be likewise adjusted by loosening the screws 78, the openings 77 permitting the adjustment. Supported on the shoulder 80, interiorly of the pot or container 29, is a plate 81 having a central opening of sufficient diameter to permit the plate or dish 39 to be passed therethrough and adapted to form a support for the strip or disc 82 of "cellophane" or similar material which is to be secured to the dish or plate 39. The manner of supporting this disc or strip of "cellophane" or the like is quite clearly illustrated in Fig. 6 of the drawings and the plate 81 supports the ring 83 which holds the plate in proper position, at the same time forming a guide or gauge for properly positioning the disc or strip 82.

Supported by the screws 84, or other suitable means, in engagement with the bottom of the glue or adhesive pot or chamber is a heating ring 85 to which current is supplied through the cable 86 connected to the switch box 87. A cable 88 leads from the switch box to the electric motor 66 and the power or current is brought into the switch box by means of the power line 89. The heat from the ring 85 maintains the adhesive or glue at the proper temperature and for cutting off the heat at the proper time I provide the thermostatic control member 90 which passes into the pot or container 29 and is submerged in the glue or adhesive. This thermostatic control member 90 operates a suitable switch to cut off the supply of current to the heating member 85 and connection is made between the thermostatic control member and switch box 87 through the cable 91. A further detailed description of this thermostatic control member and switch is not thought necessary. A hand knob 93 is shown for manipulating the switch within the box 87 to control the circuits.

Secured to and depending from the strips or plates 16 is a bracket 94 to which is pivotally connected, intermediate its ends, a treadle lever 95 having the foot engaging plate 96. Secured between the arms 7 and 3 at the upper end of the standard a, by means of the plates 97 and 98, is a bracket 99 to which is pivotally connected intermediate its ends, at 100, a lever 101 having at its outer end a hand grip 102. The plates 97 and 98 are secured to inwardly directed lips 103 on the arms 3 and 7 by means of the bolts 104 and nuts 105. A vertically extending bar 106 is pivotally connected, adjacent its upper end, to the lever 101 at 107 and adjacent its lower end is provided with an elongated opening 108 which receives the transversely extending pin 109 carried by the treadle lever 95 whereby connection is made between the lower end of the bar and said lever. Adjacent its upper end the bar 106 is provided with an opening 110 in which is connected one end of a coiled spring 111, the opposite end of the spring being connected to the adhesive or glue pot 29. This spring normally tends to hold the bar 106 and the outer or forward ends of the levers 101 and 95 in their raised positions.

Figure 3:
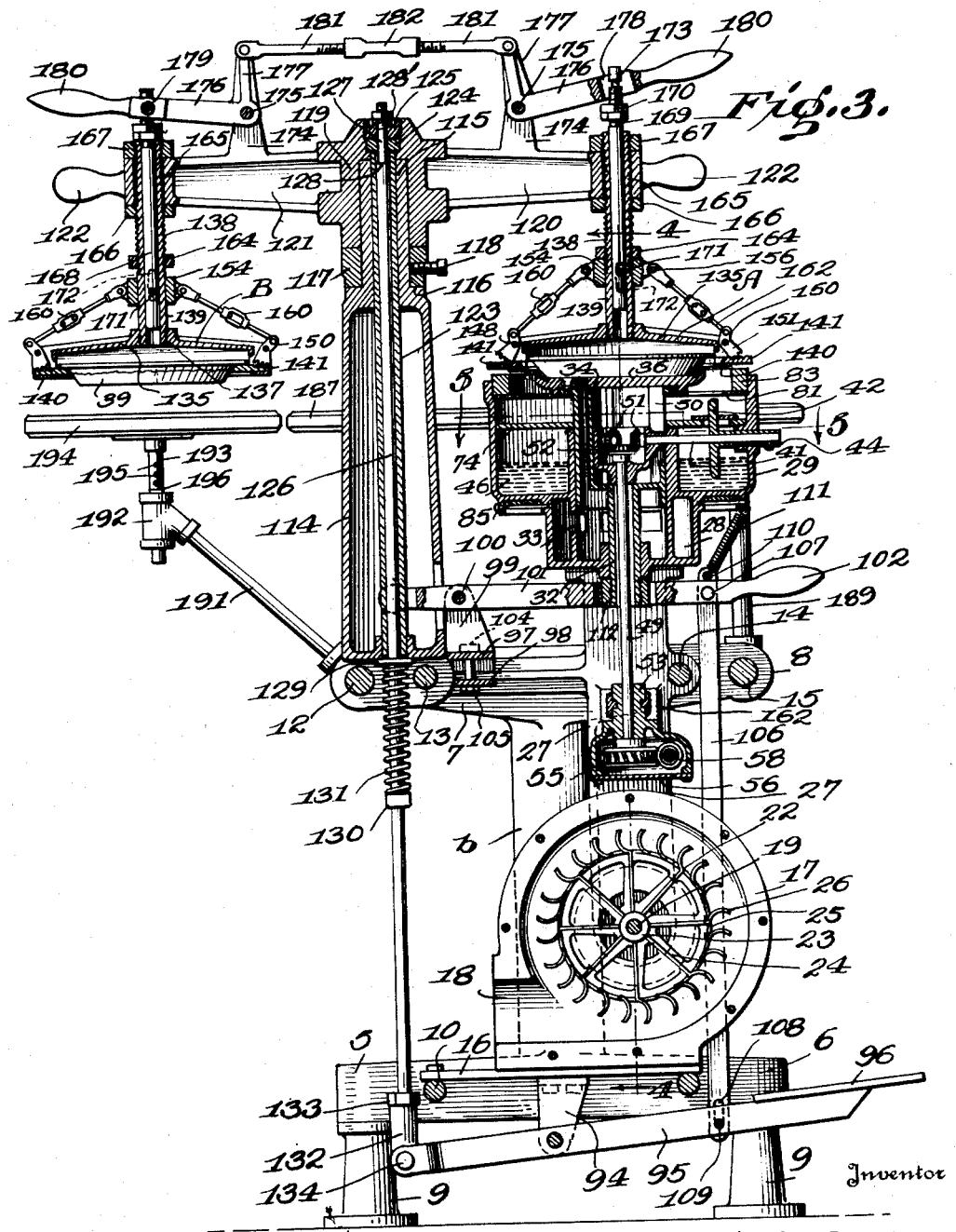
Fig. 3 is a section on the line 3—3 of Fig. 2 looking in the direction of the arrows.

Threaded on the lower end of the hollow tube 32, depending from the sleeve 33, is a collar 112 and the lever 101 is provided intermediate its ends with an opening or enlargement to receive the collar, as shown more particularly in Figs. 3 and 4 of the drawings. The lever is connected to the collar by means of the screws 113 or other suitable fastenings and as the lever 101 is swung on its pivot point 100, in a manner to be later specifically described, the sleeve 33 will be raised or lowered according to the direction of movement of the lever.

Supported by the horizontal rods 12 and 13 is a post or standard 114 having its upper end reduced as shown at 115 to provide the shoulder 116 forming a seat for the collar 117 normally held against rotation by means of the set screws 118. Rotatably mounted on the upper end of the reduced extension 115 is the casting 119 having the oppositely directed horizontal arms 120 and 121 each provided on its outer end with a hand grip 122. As shown more particularly in Fig. 3 of the drawings the post or standard 114 is hollow and the extension 115 is provided with a vertically extending opening forming a guide for the slidable sleeve 123, the upper end of the sleeve normally bearing against a washer or plate 124 positioned within a recess formed in the upper end of the casting 119 and held therein by means of the threaded plug 125. The lower end of the sleeve 123 is slidable in an opening formed in the bottom of the post or standard and adjacent its lower end the sleeve is cut away at the sides to provide recesses to receive the inner ends of the lever 101, as shown more particularly in Fig. 3 of the drawings, the end of the lever being forked so that the arms straddle the sleeve. Slidably mounted within, and extending longitudinally of, the sleeve 123 is a rod 126, the upper end of which is reduced as shown at 127 to provide the shoulder 128 normally spaced from the bottom surface of the washer or plate 124, as shown more particularly in Fig. 3 of the drawings for a purpose which will be later described. The upper end of the reduced extension 127 of the rod is threaded to receive the nut 128' which engages the outer face or surface of the plug 125. Surrounding the rod 126, and positioned between the washer 129 and the collar 130 is a coiled spring 131, the washer 129 bearing against the bottom of the post or standard 114 and the collar 130 being secured to the rod by a set screw or other suitable fastening not shown. The lower end of the rod 126 is received within the threaded socket 132 and at 133 I have illustrated a lock nut. The inner end of the treadle lever 95 is pivotally connected at 134 to the lower end of the socket 132.

Carried by the arms 120 and 121 of the rotatable casting 119 are the heads A and B which in turn carry the members which fold the edges of the "cellophane" disc or strip 82 around the edge of the dish or plate 39, while the dish or plate is held upon its support by the suction, and these heads also act to carry the sealed pie from the point where the sealing takes place to the point of delivery. As the construction of each of these heads A and B, as well as the mechanism carried thereby and the operating mechanism therefor is the same in each instance a detailed description of one will suffice for both. Each of the heads includes the top portion 135 having the depending circumferential flange 136 as shown more particularly in Fig. 4 of the drawings and the central threaded opening 137 to receive the lower end of the threaded sleeve 138 having the unthreaded portion 139, adjacent its lower end, as illustrated more particularly in Figs. 3 and 4 of the drawings and for a purpose which will be later brought out. Supported between the bottom surface of the flange 136 and the ring or band 140 are a plurality of circumferentially arranged slidable plates 141 which may be termed the folding members for folding the edge of the protecting strip beneath the edge of the dish or plate. These folding members or plates 141 are of the construction shown more particularly in Figs. 9 and 10 of the drawings having their inner edges 142 of arcuate shape and beveled as shown at 143. The upper surfaces of the plates are grooved as shown at 144 to provide rack teeth for a purpose to be later described. Alternate plates 141 are provided at their ends with the extensions 145 adapted to be received within recesses 146 formed in the ends of adjacent plates as shown more particularly in Figs. 9 and 10. The upper surfaces of each head is provided with circumferentially spaced pairs of ribs 147 and between the ribs of each pair is pivotally mounted as shown at 148 a member 149 including an upwardly directed arm 150 and an arm 151 provided with the projections 152 adapted to form teeth for engagement with the teeth formed by the grooves 144 in the plates 141. When the members 149 are in the position shown more particularly in Fig. 4 of the drawings the plates will be in an outward position but when swung in a manner to be later described the plates will be slid inwardly. The band or ring 140 which supports the plates 141 will be secured to the under surface of the head by means of the screws 153 or other suitable fastenings.

Mounted on the sleeve 138 and slidable on the unthreaded portion 139 thereof is a collar 154 provided with circumferentially spaced pairs of ears 155 between which are pivotally connected at 156 socket members 157 which carry the rods 158 having the outer ends threaded as shown at 159 to receive the turn buckle 160. Pivotally connected to each of the pivoted or swinging members 149 at 161 is a rod 162 having its end threaded as shown at 163 and adapted to be engaged by the turn buckle 160. It will thus be seen that connections are made between the slidable collar 154 and swinging members 149 so that said swinging members will be operated when the collar 154 is operated to in turn operate the plates 141 for folding the edges of the protecting strips. The upward movement of the collar 154 is limited by the nut 164 received on the threaded sleeve 138.

The upper ends of the threaded sleeves 138 pass through vertically extending openings 165 formed adjacent the ends of the arms 120 and 121 and are held in adjusted positions relative thereto by means of the nuts 166 and 167. Slidably mounted in each of the sleeves 138 is a rod 168, this rod having its upper end threaded as shown at 169 to receive the nuts 170. The rods are connected, adjacent their lower ends, to the collars 154 by means of the transversely extending pins 171 with their ends extending through elongated openings 172 formed in the sleeves 138. Adjacent its upper end each of the rods 168 is provided with a circumferentially extending groove 173. Each of the arms 120 and 121 is provided with a pair of upwardly extending projections 174 and between each pair is pivotally connected at 175 a bell crank lever including the arms 176 and 177. The arm 176 is provided intermediate its ends with a vertically extending opening 178 through which extends the upper end of the rod 168 and oppositely disposed screws 179 pass through the sides of the arm 176 with their inner ends received in the circumferentially extending groove 173 whereby connection is made between the arm of the bell crank lever and the upper end of the rod. The arms 176 of the bell crank levers are formed at their outer ends with the hand grips 180. The arms 177 of the bell crank levers are connected by means of the rods 181 and turn buckle 182 so that as one bell crank lever is operated it will in turn operate the bell crank lever in a manner and for a purpose to be later described.

The collar 117, which is mounted on the reduced extension 115 of the post or standard 114, is provided in its upper surface with oppositely disposed recesses 183 to receive the oppositely disposed projections 184 formed on the rotatable casting 119. Between the recesses the upper surface of the collar is formed with the flat portions 185 and with the inclined portion 186, these inclined portions leading from the flat portions 185 to the recesses 183. It will thus be seen that when the casting 119 is raised, in a manner to be later described, that the same may be swung or rotated to initially position the downwardly extending projections 184 on the flat surfaces 185 and a further rotation or swinging will cause the projections 184 to ride down the inclined surfaces 186 to aid in the rotary movement of the casting and allow the projections 184 to drop into the recesses 183 when aligned with said recesses. The projections will drop into the recesses on each half complete revolution of the casting.

Figure 2:
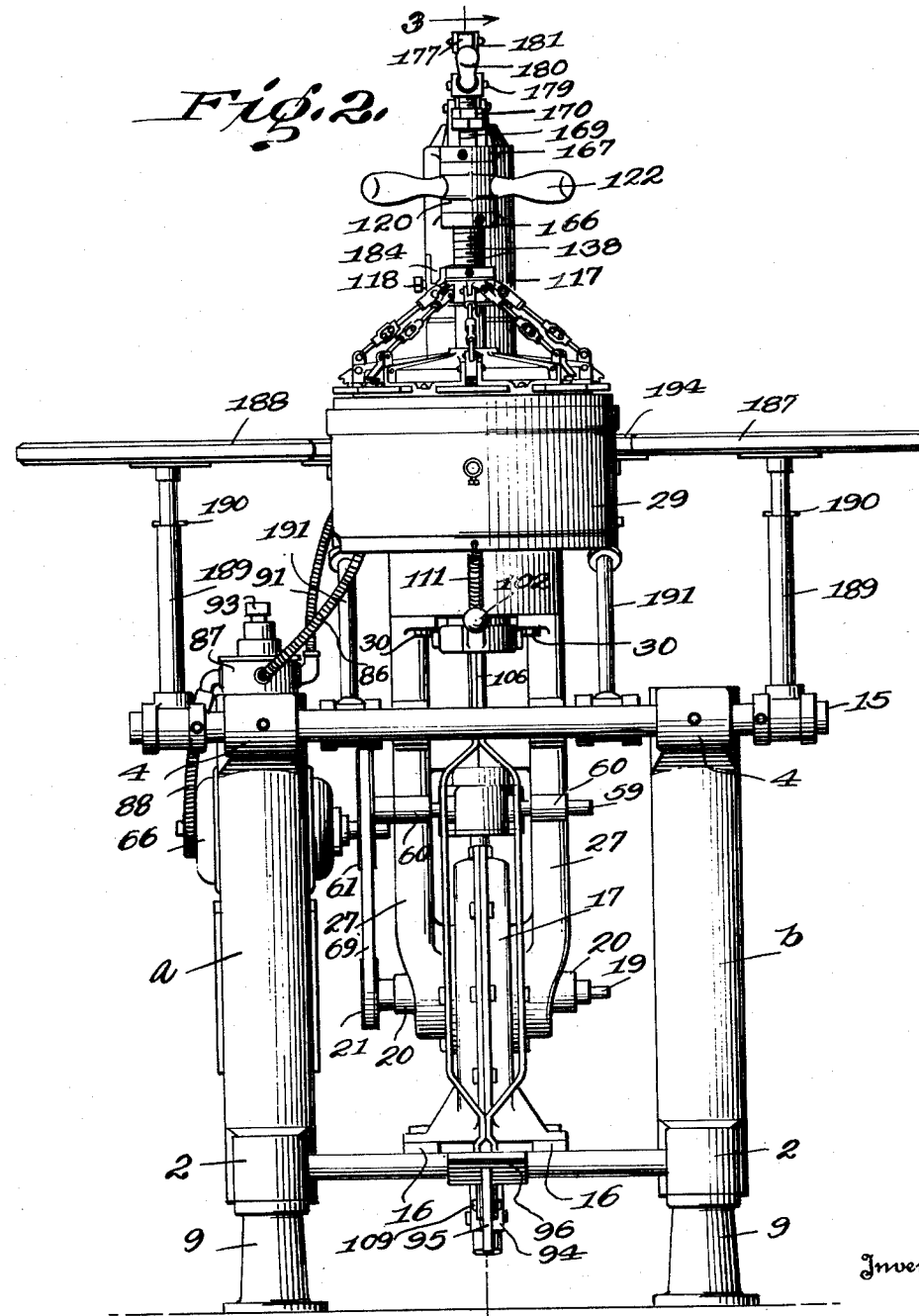
Fig. 2 is a front elevation.

Tables or platforms 187 and 188 are supported on opposite sides of the glue pot or container and dish or plate receiving member or support and are supported by means of the adjustable legs or brackets 189 carried on the ends of the horizontal rods 12 and 15 as shown more particularly in Figs. 1 and 2 of the drawings, these adjustable legs or brackets including the telescoping members held in adjusted positions by means of the transversely extending pins 190 which pass through openings formed in one of the members and engage the end of the other member. Also carried by the rod 12 and extending upwardly therefrom at an angle, as shown more particularly in Fig. 1 of the drawings, are the rods 191 having at their upper ends the vertically extending sleeves 192 through which extend the rods 193 which are secured to and support a table 194. The rod 193 is provided with a plurality of vertically spaced openings 195 through which extends a pin 196 whereby the rod may be adjusted in the sleeve. The pin will normally engage the upper end or surface of the sleeve 192. This table 194 is positioned to the rear of the machine and is adapted to receive the sealed pies in a manner to be later described. The tables 187 and 188 may be used for supporting the pies to be sealed as well as a stack of the discs or strips of "cellophane" which are to form the sealing cover. Preferably the pies will be placed upon the table 187 and the strips or discs of "cellophane" upon the table 188 within easy reach of the operator. However, I do not wish to be limited to this particular arrangement for it will be understood that the operator may so place the pies and strips as to secure the best operation for feeding the same to position.

In Figs. 19 and 20 I have illustrated a slightly different form of plates which fold the edges of the protecting strips, these plates corresponding to the plates 141, previously described. The plates 197 shown in Figs. 19 and 20 have their inner edges arcuate shaped as in the form shown more particularly in Figs. 9 and 10 and upwardly and inwardly beveled as shown at 198. Extending inwardly from the upper edge of the beveled portion 198 is the downwardly inclined portion 199 to receive the flange 72 of the plate or dish, these flanges very often extending downwardly at an angle. The plates 197 are formed in their upper surfaces with the grooves 200 forming teeth to be engaged by the teeth of the members 149. The plates 197 are formed at one end, adjacent the inner edge, with a reduced extension 201 adapted to be received in a recess 202 formed in the under surface of the plate at the opposite end. As shown in Figs. 19 and 20 the projection on one plate will be received in the recess of the adjacent plate.

In Figs. 21, 22 and 23 of the drawings I have illustrated a slightly different form of means or levers for operating the folding mechanism or in other words the plates or member for folding the edge of the disc or strip of "cellophane" or the like beneath the edge of the dish or plate containing the pie, this operating mechanism or means also including means whereby the sealed pie may be automatically released or deposited at a predetermined point. In that form of my invention disclosed in Figs. 21, 22 and 23 bell crank levers are pivotally connected at 203 to the upwardly extending projections 174 carried by the arms 120 and 121 formed on the casting 119 and each of these bell crank levers includes the arms 204 and 205 the arms 204 having at their outer ends a hand grip 6 while the lower ends of the arms 205 are beveled as shown at 207 for a purpose which will be later apparent. The arms 204 of the bell crank levers are pivotally connected at 208 to the rods 168 in the same manner that the arms 176 are connected in that form of the invention disclosed more particularly in Figs. 1, 2, 3 and 11 of the drawings, screws or pins carried by the arms of the levers having their ends received in a circumferentially extending groove formed adjacent the upper end of the rod 168. Pivotally connected at 209 to each of the arms 120 and 121 is a bar 210 having a recess 211 formed in its upper edge adjacent its outer end, this recess having a straight wall 212 and an inclined wall or bottom 213 corresponding to the beveled end 207 of the arm 205 of the bell crank lever, as shown more particularly in Fig. 22 of the drawings. The inner end of the bar 210 is formed with a notch as shown at 214 to receive a pin 215 carried by a slidable plunger 216, the lower end of the plunger being beveled as shown at 217 while its upper end is reduced as shown at 218 and adapted to pass through an opening formed in the casting 119. A coiled spring 219 surrounding the reduced extension 218 as shown more particularly in Fig. 22 of the drawings normally tends to hold the plunger in its lowermost position with the outer end of the bar 210 raised. Secured to the outer face of the collar 117, by means of the screws 220 or other suitable fastenings, is a plate 221 having the upwardly extending projection 222 with its upper edge beveled as shown at 223. In the form of the invention shown in Figs. 21, 22 and 23 a coiled spring 224 surrounds each of the rods 138 between the collar 154 and head 135 carried thereby and normally tends to force the collar upwardly. With the exception of the features herein pointed out the form of device illustrated in Figs. 21, 22 and 23 is the same as that illustrated in Figs. 1 to 20 inclusive and further description is thought unnecessary at the present time.

In Fig. 24 of the drawings I have illustrated the manner in which a plurality of my machines may be grouped and while I have illustrated the grouping of only two machines it will be understood that the same principle may be carried out in grouping a larger number. As shown when a plurality of machines are grouped a support c is used intermediate the machines corresponding to the supports a and b and the lengths of the rods 12, 13, 14 and 15 will be extended so as to pass through bearings in the arms 7 and 8 of each of the standards. Also when machines are grouped I will provide tables 225 and 226 at the sides of the end machines, these tables corresponding to the tables 187 and 188 and a table 227 will be positioned between adjacent machines. Each of the tables will be supported from the rods 14 and 15, in the same manner as the tables 187 and 188 are supported, the supporting means including the sleeves 228 and rods 229, the rods 229 being telescoped within the sleeves 228 and held in adjusted position by means of cross pins 230 placed through openings in the rods and engageable with the upper ends of the sleeves.

In using the discs or protecting strips of "cellophane" or similar material I have found that it aids in preventing curling of the material, prior to its application or connection to the dish or plate over the pie to form an ink line 231 around the surface of the disc or strip adjacent the outer edge thereof. This forms a reinforcement or stiffening to prevent curling of the material as stated.

From the above detailed description it is thought that the construction will be clearly understood and I will now endeavor to more fully bring out the operation. In Fig. 11 of the drawings I have shown the casting 119 with its arms 120 and 121 and their associated parts rotated in a position at right angles to the position shown more particularly in Figs. 1, 2, 3 and 4 of the drawings and the projections 184 are shown positioned upon the flat surfaces 185 of the collar 117. In this position a plate or dish 39 is shown supported by the head B after the protecting strip has been placed over the pie and secured to the edge of the dish or plate and the operator is ready to proceed with the sealing of another pie. The support 51 for receiving the dish, with the pie, will be in the position shown more particularly in Figs. 11 and 12 of the drawings. When the support 51 is in the position shown in Figs. 11 and 12 the sleeve 33 will, of course, be in its lowermost position to cut off the air passages 70 so that no suction is created through the openings 37 of the support or the passages 34 communicating therewith. The operator takes a plate containing a pie, preferably from the table 187 and passes the same through the opening in the ring or band 81 so that the flange thereof will rest upon and be supported by the adhesive applying rollers, as shown more particularly in Fig. 6 of the drawings, the beveled portions 43 of the adhesive applying discs or rollers being in contact, as shown, with the tapered side wall 73 of the dish or plate. When supported by the adhesive applying rollers adhesive will be applied to the under surface of the flange and to the upper portion of the beveled or inclined side wall 73 and while I have illustrated means for applying a continuous line or ribbon of adhesive it will be understood that the adhesive might be applied in spots. During the time that the adhesive is being applied the operator will take a disc or sheet of the protecting material 82 and place the same upon the ring 81, as shown more particularly in Fig. 6 of the drawings, and positioned over the pie contained in the dish or plate. With the pie and protecting disc or strip positioned as just described the operator will grasp the hand hold 122 and swing the casting 119 so that the projections 184 will ride over the inclined surfaces 186 and be brought into alignment with the recesses 183. When in alignment with the recesses the head 119 will be allowed to drop to lower the casting and to bring the head A over the pie supported upon the adhesive applying rollers. As the casting 119 drops or lowers it naturally carries with it the sleeve 123 and rod 126 which lower the rear ends of the levers 101 and 95 and raise the forward ends of these levers into the position shown more particularly in Figs. 1 and 3 of the drawings. This movement of the lever 101 through means of the tube 132 raises the sleeve 33 into the position shown more particularly in Figs. 3 and 4 of the drawings and uncovers the ports 70 thereby allowing suction, due to the fan 22, through the passages 27, openings 70, passages 34 and openings 37 to draw and hold the plate tightly upon the support 51. The upward movement of the sleeve with the support 51 naturally raises the dish containing the pie into the position shown more particularly in Figs. 3 and 4 of the drawings and this upward movement causes the edges of the protecting strip or disc 82 to engage the inner edges of the plates 141 and this turns the edge of the protecting strip down, as shown more particularly in Fig. 14 of the drawings. With the dish containing the pie in the position just described, and illustrated in Fig. 14, the operator will grasp the handhold 180 of the bell crank lever pivotally connected at 175 to the projection 74, positioned at the forward face of the machine, and as the arm 176 of the lever is connected to the rod 168, as the lever is swung the rod will be lowered and through means of the pin 171 lower the collar 154 slidable on the sleeve 138. The downward movement of the collar, through means of the connections, swings the members 149 upon their pivots 148 and through the intermeshing of the teeth 152 with the teeth formed on the upper faces of the plates 141 move these plates inwardly towards the dish or plate containing the pie. As they move inwardly they carry with them the downturned edge of the protecting strip 82 and engage the same with the adhesive previously applied to the dish or plate and hold the same in close contact therewith, as shown more particularly in Fig. 15 of the drawings, the plate being held by the suction as previously described thus causing a more secure seal. After this operation the operator will engage the plate 96 on the foot treadle lever 95 and press downwardly upon the same. This movement will draw downwardly on the outer end of the lever 101, which is connected to the sleeve 32, and pull down on the sleeve 32 to lower the same into a position to again close the openings or ports 70 and cut off suction. When this operation takes place the plate containing the pie will still be supported in the head A by the plates 141. As the forward end of the lever 101 is lowered the rear end will be raised to in turn raise the sleeve 132 and at the same time the raising of the rear end of the lever 95 will raise the rod 126. Due to the difference in leverage the raising of the rear end of the lever 101 will initially raise the casting 119 and further movement will cause the shoulder 128 at the upper end of the rod 126 to engage the washer 24 and give a relatively quick raising movement to the casting. As the casting is raised the projections 184 will be removed from the recesses 183 and the casting may be rotated again into the position shown in Fig. 11 and the operation just described in sealing the pies may be repeated. At the time that the bell crank lever, connected to the arm 120 is operated to lower the rod 168 and operate the folding plates 141 of the head A, shown in Fig. 3, the bell crank connected to the arm 121 will be operated through means of the connecting rods 181 and turn buckle 182, and as the arm 176 of this last mentioned bell crank lever is raised it will draw the rod 168, of the head B upwardly and due to the connection with the collar 154 the collar will be raised and operate the members 149 to withdraw the plates 141 from engagement with the plate or dish 39 and allow the plate containing the pie to drop either onto the hand of the operator or directly onto the table 194, as desired. From the above it will thus be seen that after the protecting strip or disc has been secured to the plate that the plate with the pie is carried and supported into a position to be automatically released at the time that an operation is taking place to apply another protecting strip or disc to another plate. After the protecting strip or covering is secured to the plate, over the pie, it is held a sufficiently long time to allow the adhesive to harden. The covered article is shown in Fig. 16 of the drawings with the protecting strip or covering secured to the plate and over the top of the pie.

In that form of my invention shown in Figs. 21, 22 and 23 of the drawings I have provided means for automatically releasing the sealed pie as the casting 119 is lowered to its normal operating position. In this form of the invention when the hand grip 206 of the bell crank lever, connected to the arm 120, is grasped to operate the mechanism carried by the head A the arm 205 will be swung rearwardly and engaged in the recess 211 of the arm 210 and thus held by means of the coiled spring 219. The movement of the bell crank lever, just described, lowers the collar 154 and slides the folding plates 141 under the flange of the plate or dish. When thus held the casting 119 will be operated, as described, for that form of the invention disclosed in Figs. 1 to 20 inclusive of the drawings and to position the head with the supported pie at the position of the head B of Fig. 21. In Fig. 21 the projections 184 of the casting are shown just about to enter the recesses 183 and the casting 119 to drop into its lowermost position. As the casting lowers the end of the plunger 216 carried by the arm 121 will engage the projection 222 and be raised to disengage the arm 205 of the bell crank lever from the recess 211. When released the coiled spring 224 forces the collar 154 upwardly to withdraw the plates 141 from the dish or plate and allow the same to be released. In this form of the invention it will be noted that the releasing of the sealed pie from the supporting head is automatic as distinguished from the manually operated means shown in the other figures of the drawings.

Having fully described my invention what I claim as new and desire to secure by Letters Patent is:—

1. A machine of the character described for applying a protecting covering to a plate including means for applying an adhesive to the plate, and means for folding a portion of the covering around and under the edge of the plate and into engagement with the adhesive to form a seal.

2. A machine of the character described for applying a protecting covering to a plate including means for applying an adhesive to the plate and bodily rotating the plate as the adhesive is applied, and means for engaging a portion of the covering with the adhesive to form a seal.

3. A machine of the character described for applying a protecting covering to a plate including rotatable members for applying an adhesive to the plate and rotating the plate during such application of the adhesive, and means for engaging a portion of the covering with the adhesive to form a seal.

4. A machine of the character described for applying a protective covering to a plate including adhesive applying discs adapted to support and rotate the plate, and means for engaging a portion of the covering with the adhesive to form a seal.

5. A machine of the character described for applying a protecting covering to a plate, means for supporting the plate, means for initially supporting the protecting covering above the plate, means for applying an adhesive to the plate, means for operating the plate support to engage the plate with the protecting covering, and means for engaging a portion of the covering to fold the same into contact with the adhesive to secure the covering to the plate.

6. A machine of the character described for applying a protecting covering to a plate including means for supporting the plate, means for initially supporting the protecting covering above the plate with its edge portion projecting beyond the edge of the plate, means for applying an adhesive to the plate, means for operating the plate support to engage the plate with the protecting covering, and means for folding the projecting edge portion of the covering around the edge of the plate and to engage the same with the adhesive to form a seal.

7. A machine of the character described for applying a protecting covering to a plate including means for supporting the plate, suction means for holding the plate upon the support, and means for securing the edge portion of the covering to the plate.

8. A machine of the character described for applying a protecting covering to the plate including a support for the plate, suction means for drawing the plate into tight engagement with the support, and means for engaging and securing an edge portion of the protecting covering to the plate while being held by the suction.

9. A machine of the character described for applying a protecting covering to a plate including adhesive applying members adapted to initially support the plate, means for initially supporting the protecting covering above the plate, a member adapted to be engaged with the plate to remove the same from the adhesive applying members and engaging the same with the protecting covering, and means for folding the edge of the protecting cover around the edge of the plate and into engagement with the adhesive.

10. A machine of the character described for applying a protecting covering to a plate including adhesive applying members for initially supporting the plate and rotating the same for forming a line of adhesive around the edge thereof, means for initially supporting the protecting covering above the plate, and means operable to remove the plate from the adhesive applying members and to engage the plate with the protecting covering, and means adapted to be engaged with the edge of the protecting covering for folding the same around the edge of the plate and into engagement with the line of adhesive to form a seal.

11. A machine of the character described for applying a protecting covering to a plate including adhesive applying members for initially supporting the plate and rotating the same for forming a line of adhesive around the edge thereof, means for initially supporting the protecting covering above the plate, and means operable to remove the plate from the adhesive applying members and to engage the plate with the protecting covering, and slidable plates adapted to be engaged with the edge of the protecting covering for folding the same around the edge of the plate and into engagement with the line of adhesive to form a seal.

12. A machine of the character described for applying a protecting covering to a plate including adhesive applying members adapted to initially support the plate, means for initially supporting the protecting covering above the plate, a movable supporting member initially positioned below and out of engagement with the plate, means for raising said last mentioned member to engage the plate and remove the same from engagement with the adhesive applying members, means for folding the edge of the protecting covering around the edge of the plate, and means for creating a suction to hold the plate upon the movable supporting member.

13. A machine of the character described for applying a protecting covering to a plate including adhesive applying members adapted to initially support the plate, means for initially supporting the protecting covering above the plate, a movable supporting member initially positioned below and out of engagement with the plate, means for raising said last mentioned member to engage the plate and remove the same from engagement with the adhesive applying members, means for folding the edge of the protecting covering around the edge of the plate, and means for creating a suction to hold the plate upon the movable supporting member, said suction being cut off when the movable supporting member is out of engagement with the plate.

14. A machine of the character described for applying a protecting covering to a plate including a support for the plate, and a plurality of heads adapted to be successively positioned relative to the support, and means carried by the heads for engaging the edge of the protecting cover with the plate and for supporting the plate with the protecting cover thereon.

15. A machine of the character described for applying a protecting covering to a plate including a support for the plate, a plurality of heads adapted to be successively positioned relative to the support, and means carried by the heads for folding the edge of the protecting covering around the edge of the plate.

16. A machine of the character described for applying a protecting covering to a plate including means for applying an adhesive to the plate, a support adapted to receive the plate from the adhesive applying means, a head adapted to be positioned relative to the support and over the plate, and means carried by the head for folding the edge of the protecting covering around the edge of the plate and into engagement with the adhesive.

17. A machine of the character described for applying a protecting covering to a plate including a support for the plate, a rotatable member, a head carried by the rotatable member and adapted to be positioned relative to the support, and means carried by the head for folding the edge of the protecting covering around the edge of the plate, said last mentioned means forming a support and carrier for the plate as the rotatable member is operated for moving the head out of position relative to the plate support.

18. A machine of the character described for applying a protecting covering to a plate including a support for the plate, a rotatable member, a plurality of heads carried by the rotatable member and adapted to be successively positioned relative to the plate support, and means carried by the heads for folding the edge of the protecting covering around the edge of the plate, said last mentioned means forming a support for the plate to carry the same from the plate support as the rotatable member is operated.

19. A machine of the character described for applying a protecting covering to a plate including a support for the plate, a rotatable member, a head carried by the rotatable member, means carried by the head for folding the edge of the protecting covering around the edge of the plate, and means for raising and lowering the rotatable member whereby the same may be rotated to position the head relative to or away from the plate.

20. A machine of the character described for applying a protecting covering to a plate including a support for the plate, a rotatable member, a head carried by the rotatable member, means carried by the head and adapted to be engaged with the edge of the protecting covering for folding the same around the edge of the plate, means for holding the rotatable member in position with the head positioned relative to the plate, and means for raising the rotatable member to permit the same to be operated to remove the head from position relative to the plate.

21. A machine of the character described for applying a protecting covering to a plate including a support for the plate, a rotatable member, a head carried by the rotatable member, means carried by the head and adapted to be engaged with the edge of the protecting covering for engaging the same with the plate, means for holding the rotatable member with the head positioned relative to the support and over the plate, and means for raising the rotatable member whereby the same may be operated to remove the head from position relative to the plate support, said head supporting and carrying the plate during the rotation of the rotatable member.

22. A machine of the character described for applying a protecting covering to a plate including a support for the plate, a rotatable member, a head carried by the rotatable member, means carried by the head for engaging the edge of the protecting covering to fold the same around the edge of the plate, means for positioning the rotatable member to position the head over the plate and support, means whereby the rotatable member may be raised to permit operation of the rotatable member to remove the head from position relative to the support, the plate being carried by the head as it is removed from position relative to the support, and means for releasing the plate.

23. A machine of the character described for applying a protecting covering to a plate including a support for the plate, a rotatable member, a plurality of heads carried by the rotatable member and adapted to be successively positioned over the plate support, means for normally holding the rotatable member with one of the heads carried thereby positioned relative to the dish support, means carried by each of the heads for folding the edge of the protecting covering around the edge of the plate and forming a carrier for the plate, means for raising the rotatable member to permit operation thereof, and means for simultaneously operating the folding means, the means carried by that head positioned relative to the plate support folding the edge of the covering as the means carried by the other head releases the plate carried thereby.

24. A machine of the character described for applying a protecting covering to a plate including a support for the plate, a rotatable member, a plurality of heads carried by the rotatable member and adapted to be successively positioned over the plate support, means for normally holding the rotatable member with one of the heads carried thereby positioned relative to the plate support, slidable members carried by each of the heads for folding the edge of the protecting covering around the edge of the plate and forming a carrier for the plate, means for raising the rotatable member to permit operation thereof, and means for simultaneously operating the slidable members carried by the heads, the members carried by that head positioned relative to the plate support folding the edge of the covering as the members carried by the other head are moved to release the plate carried thereby.

25. A machine of the character described for applying a protecting covering to a plate including a movable plate support, a rotatable member, a head carried by the rotatable member and adapted to be positioned relative to the movable plate support, means carried by the head for folding the edge of the protecting covering around the edge of the plate, and means for simultaneously raising the rotatable member and operating the movable plate support whereby the rotatable member may be operated from position relative to the plate support and carry the plate therewith.

26. A machine of the character described for applying a protecting covering to a plate including a support for the plate, a rotatable member, a head carried by the rotatable member and adapted to be positioned relative to the plate support, means operable to fold the edge of the protecting covering around the edge of the plate, the plate being carried by the head as the rotatable member is operated to remove the head from position relative to the plate support, and means for automatically releasing the plate carried by the head.

27. A machine of the character described for applying a protecting covering to a plate, a plate support, a rotatable member, a head carried by the rotatable member and adapted to be positioned relative to the plate support, means operable for engaging the protecting covering to fold the edge thereof around the edge of the plate, the plate being carried by the head as the rotatable member is operated to move the head from position relative to the plate support, means for raising and lowering the rotatable member, and means for releasing the plate carried by the head as the rotatable member is lowered.

28. A machine of the character described for applying a protecting covering to a plate, a plate support, a rotatable member, a head carried by the rotatable member and adapted to be positioned relative to the plate support, means operable for engaging the protecting covering to fold the edge thereof around the edge of the plate, the plate being carried by the head as the rotatable member is operated to move the head from position relative to the plate support, means for raising and lowering the rotatable member, and means for automatically releasing the plate carried by the head as the rotatable member is lowered.

29. A machine of the character described for applying a protecting covering to a plate having an outwardly directed flange portion, including adhesive applying members adapted to initially support the plate and apply a line of adhesive to the underside of the flange of the plate, means for initially supporting the protecting covering above the plate, a member adapted to be engaged with the plate to remove the same from the adhesive applying members, and means for folding the edge of the protecting covering around and under the flange portion of the plate and into engagement with the line of adhesive on the underside thereof.

30. A machine of the character described for applying a protecting covering to a plate including a support for the plate, a head adapted to be positioned relative to the support, and means carried by the head for engaging the edge of the protecting cover with the plate and for supporting the plate with the protecting covering thereon.

31. A machine of the character described for applying a protecting covering to a plate including a support for the plate, and a head adapted to be positioned relative to the support, said head including members operable for engaging the edge of the protecting cover with the plate and for supporting the plate with the protecting cover thereon.

32. A machine of the character described for applying a protecting covering to a plate including a support for the plate, and a head adapted to be positioned relative to the support, said head including slidable members operable for engaging the edge of the protecting cover with the plate and for supporting the plate with the protecting cover thereon.

CHARLES M. HESSON.